United States Patent [19]
Wilkins

[11] Patent Number: 5,446,919
[45] Date of Patent: Aug. 29, 1995

[54] COMMUNICATION SYSTEM AND METHOD WITH DEMOGRAPHICALLY OR PSYCHOGRAPHICALLY DEFINED AUDIENCES

[76] Inventor: Jeff K. Wilkins, P.O. Box 4223, Stanford, Calif. 94309

[21] Appl. No.: 773,520

[22] Filed: Oct. 9, 1991

Related U.S. Application Data

[63] Continuation-in-part of Ser. No. 482,286, Feb. 20, 1990, abandoned.

[51] Int. Cl.6 .............................................. H04H 1/02
[52] U.S. Cl. ...................................... 455/6.2; 455/3.1; 348/10
[58] Field of Search .................. 405/2, 3.1–3.2, 405/4.1, 4.2, 5.1, 6.1, 6.2, 6.3; 358/84, 86, 142; 348/6, 7, 8, 10, 11, 12, 13

[56] References Cited

U.S. PATENT DOCUMENTS

| | | | |
|---|---|---|---|
| 3,366,731 | 1/1968 | Wallerstein | 358/86 |
| 3,639,686 | 2/1972 | Walker et al. | 455/4.1 |
| 4,331,974 | 5/1982 | Cogswell et al. | 358/86 |
| 4,475,123 | 10/1984 | Dumbauld et al. | 358/86 |
| 4,602,279 | 7/1986 | Freeman | 358/86 |
| 4,625,235 | 11/1986 | Watson | 358/86 |
| 4,638,359 | 1/1987 | Watson | 358/142 |
| 4,716,410 | 12/1987 | Nozaki | 358/86 |
| 5,099,422 | 3/1992 | Foresman et al. | 358/86 |
| 5,155,591 | 10/1992 | Wachob | 455/4.2 |

*Primary Examiner*—Edward F. Urban
*Assistant Examiner*—Nguyen Vo
*Attorney, Agent, or Firm*—Thomas J. McFarlane

[57] ABSTRACT

A communication system capable of targeting a demographically or psychographically defined audience. A master database (20) is maintained, containing demographic and psychographic information about each audience member. This information is transmitted and stored in a channel selection/decoder (100) unit associated with each audience member's receiver. Multiple media messages are transmitted to each audience member. Accompanying the transmission is a selection profile command, which details the demographic/psychographic profile of audience members that are to receive each media message. The channel selector/decoder (100) unit associated with each member's receiver compares the selection profile with the demographic/psychographic information about the audience member and selects the appropriate media message for that audience member.

28 Claims, 8 Drawing Sheets

| | PROGRAM SEGMENT 200 | IF HOUSEHOLD INCOME <$20K THEN CH.4 $20K-80K THEN CH.2 >$80K THEN CH.5 210 | | | |
|---|---|---|---|---|---|
| CH. 1 | | | | | |
| CH. 2 | | | FORD MUSTANG ADVERTISEMENT DEFAULT COMMERCIAL 224 | STAY TUNED TO THIS CHANNEL 234 | PROGRAM SEGMENT 240 |
| CH. 3 | | | | | |
| CH. 4 | | | HYUNDAI EXCEL ADVERTISEMENT COMMERCIAL ALTERNATIVE #2 222 | GO TO CH. 2 232 | |
| CH. 5 | | | MERCEDES 500SL ADVERTISEMENT COMMERCIAL ALTERNATIVE #1 220 | GO TO CH. 2 230 | |
| CH. 6 | | | | | |
| | PROGRAM SEGMENT | SELECTION PROFILE COMMAND | COMMERCIAL | SELECTION PROFILE COMMAND | PROGRAM SEGMENT |

FIG.-3

| | PROGRAM SEGMENT | | | | | PROGRAM SEGMENT 340 | |
|---|---|---|---|---|---|---|---|
| CH. 6 | | | | | | | |
| CH. 5 | PROGRAM 02 STARTING ELSE BARKER CH. 5  305 | MERCEDES 500SL ADVERTISEMENT COMMERCIAL ALTERNATIVE #1  320 | PROGRAM 02 ENDING RETURN TO CH. 4  330 | | | | |
| CH. 4 | PROGRAM 28 STARTING ELSE BARKER CH. 4  310 | HYUNDAI EXCEL ADVERTISEMENT COMMERCIAL ALTERNATIVE #2  322 | PROGRAM 28 ENDING RETURN TO CH. 2  332 | | | | |
| CH. 3 | | | | | | | |
| CH. 2 | | FORD MUSTANG ADVERTISEMENT DEFAULT COMMERCIAL  324 | PROGRAM 02, 28 ENDING NO CHANGE  334 | | | | |
| CH. 1 | PROGRAM SEGMENT 300 | | | | | | |
| | PROGRAM SEGMENT | SELECTION PROFILE COMMAND | COMMERCIAL | SELECTION PROFILE COMMAND | PROGRAM SEGMENT | | |

FIG.-4

| | PROGRAM SEGMENT | SELECTION PROFILE COMMAND | COMMERCIAL | SELECTION PROFILE COMMAND | PROGRAM SEGMENT |
|---|---|---|---|---|---|
| CH. 6 | | | | | |
| CH. 5 | | PROGRAM 81 STARTING ELSE BARKER CH. 5  410 | MERCEDES 500SL ADVERTISEMENT COMMERCIAL ALTERNATIVE #1  420 | PROGRAM 81 ENDING RETURN TO CH. 2  430 | |
| CH. 4 | | | HYUNDAI EXCEL ADVERTISEMENT COMMERCIAL ALTERNATIVE #2  422 | PROGRAM 02 ENDING RETURN TO CH. 2  432 | |
| CH. 3 | | | FORD MUSTANG ADVERTISEMENT DEFAULT COMMERCIAL  424 | | |
| CH. 2 | PROGRAM SEGMENT  400 | PROGRAM 02 STARTING ELSE BARKER CH. 4  405 | | PROGRAM 02, 81 ENDING NO CHANGE  434 | PROGRAM SEGMENT  440 |
| CH. 1 | | | | | |

FIG.-5

| | PROGRAM SEGMENT | SELECTION PROFILE COMMAND | COMMERCIAL | SELECTION PROFILE COMMAND | PROGRAM SEGMENT |
|---|---|---|---|---|---|
| CH. 6 | | | | | |
| CH. 5 | | PROGRAM 81 STARTING ELSE BARKER CH. 2 501 | MERCEDES 500SL ADVERTISEMENT COMMERCIAL ALTERNATIVE #1 520 | PROGRAM 100 STARTING ELSE BARKER CH. 2 530 | |
| CH. 4 | | PROGRAM 02 STARTING ELSE BARKER CH. 2 502 | HYUNDAI EXCEL ADVERTISEMENT COMMERCIAL ALTERNATIVE #2 522 | PROGRAM 200 STARTING ELSE BARKER CH. 2 532 | |
| CH. 3 | | PROGRAM 02 ENDING 509 | | | |
| CH. 2 | PROGRAM SEGMENT 500 | PROGRAM 81 ENDING 510 | FORD MUSTANG ADVERTISEMENT DEFAULT COMMERCIAL 524 | 534 | PROGRAM SEGMENT 540 |
| CH. 1 | | | | | |

FIG.-6

|  | PROGRAM SEGMENT | SELECTION PROFILE COMMAND | COMMERCIAL | SELECTION PROFILE COMMAND | PROGRAM SEGMENT |
|---|---|---|---|---|---|
| CH. 6 |  |  |  |  |  |
| CH. 5 | PROGRAM SEGMENT 602 | PROGRAM 81 STARTING ELSE BARKER CH. 2  612 | MERCEDES 500SL ADVERTISEMENT COMMERCIAL ALTERNATIVE #1  622 | PROGRAM 02 ENDING RETURN TO CH. 4  632 | PROGRAM SEGMENT 642 |
| CH. 4 | PROGRAM SEGMENT 601 | PROGRAM 02 STARTING ELSE BARKER CH. 5  611 | HYUNDAI EXCEL ADVERTISEMENT COMMERCIAL ALTERNATIVE #2  621 | PROGRAM 28 ENDING RETURN TO CH. 2  631 | PROGRAM SEGMENT 641 |
| CH. 3 |  |  |  |  |  |
| CH. 2 | PROGRAM SEGMENT 600 | PROGRAM 28 STARTING ELSE BARKER CH. 4  610 | FORD MUSTANG ADVERTISEMENT DEFAULT COMMERCIAL  620 | PROGRAM 81 ENDING RETURN TO CH. 5  630 | PROGRAM SEGMENT 640 |
| CH. 1 |  |  |  |  |  |

FIG.-7

COMMUNICATION SYSTEM AND METHOD WITH DEMOGRAPHICALLY OR PSYCHOGRAPHICALLY DEFINED AUDIENCES

This application is a continuation-in-part of my application Ser. No. 07/482,286, filed Feb. 20, 1990, now abandoned.

BACKGROUND OF THE INVENTION

1. Field of the Invention

This invention relates to communication systems, and in particular, communications systems capable of targeting a demographically or psychographically defined audience.

2. Description of the Prior Art

Although television has historically been a broadcast technology (meaning programs and commercials are designed for 'mass appeal' without segmentation by demographic or psychographic factors), a number of techniques have evolved for targeting select audiences.

Advertisers start with the profile of the target customer for their product or service. Market research companies routinely audit television show audiences (via phone survey, mail, etc.) to characterize the demographic and psychographic profile of viewers. Advertisers use this information to pick programs with large numbers of viewers most like the target customer. Naturally, this information also helps the advertiser shape the content of the advertisement so as to appeal to the tastes of the target audience.

Targeting advertising by television program has a fundamental problem, however. Audiences are heterogeneous, making it impossible for advertisers to get the appropriate message efficiently to only the target audience. With conventional television, it is impossible to split the audience into finer groups, targeting each with a different commercial message. This is a universally useful capability, as will be shown in Objects and Advantages.

With the advent of cable television systems, new methods were developed to target programming, driven by the need to control viewing of pay-per-view programs. The addressable converter was developed (see prior art, for example U.S. Pat. Nos. 4,475,123, 4,625,235, 4,638,359, 4,716,410). These addressable systems assign each household's set-top addressable converter a unique address. In response to a viewer's order for a pay channel or pay-per-view event, an address and authorization command is sent to that viewer's converter. A disadvantage of using this approach for targeting advertising is immediately obvious: pay-per-view addressability is not transparent to the viewer who must first order the program and then tune it in at the broadcast time.

In addition, this approach of transmitting a list of authorized addresses is inefficient for targeting advertising by household based on psychographic and demographic data. The viewers of each pay-per-view event change in a way not predictable by knowledge of the household's demographics and psychographics. Hence, a complete list of authorized addresses must be transmitted. By contrast, targeted advertising will often utilize the same demographic/psychographic parameters. Thus, transmission requirements can be reduced by storing each household's demographic and psychographic data at the set-top and only transmitting the selection profiles defining the target audience.

The most elementary type of targeting involves the use of split cable system as detailed in U.S. Pat. No. #3,366,731, issued Jan. 30, 1968 to Edward Wallerstein for Television Distribution System Permitting Program Substitution for Selected Viewers. A split cable system is constructed with two cables originating from a single transmitting source. One advertisement is inserted on one cable and another advertisement on the other cable. The limitation of this approach is that it can only be applied to split cable systems, and does not allow arbitrary selection of target audiences.

A further refinement of television targeting technology is shown in U.S. Pat. 3,639,686, issued Feb. 1, 1972 to Harold R. Walker and Ira Kamen for Television Receiver Cut-In Device. This system uses an auxiliary television signal which contains both a video channel and control information. The auxiliary television signal is broadcast throughout a broadcast area with a particular control signal identifying the class of viewers to be reached by the auxiliary television signal. Each television receiver has a special decoder to decode and interpret the control signals. The decoder switches to the special signal when it receives a particular address signal identifying the decoder as in the class to which the signals are to be transmitted. The limitation of this approach is that the information contained in the receivers is static-once the receivers have been programmed with information and installed in a viewer's house it cannot be updated. Thus, Walker's targeting cannot be varied at the will of advertisers/market researchers.

Two approaches to the static nature of Walker's targeting have been advanced in the prior art. U.S. Pat No. 4,602,279 Freeman, M. J. "Method For Providing Targeted Profile Interactive CATV Displays" assignor to ACTV, Inc. Port Washington, N.Y. details a system that relies on viewer input of demographic data. The system utilizes the excess bandwidth of the cable system to transmit multiple commercials. A selection profile (what class of viewer) is transmitted from the head-end (in the vertical blanking interval). However, the actual demographic data is acquired interactively from the viewer (e.g. the tv displays questions like "Are you a cat lover?, How old are you?, What car do you drive?" and the set-top stores the answers). The answers are compared with the selection profile to determine the proper channel selection. While innovative in design, the system requires input from the user to form the demographic database. This interactivity is likely to annoy users—and there is no guarantee that viewers would respond. Further, advertisers could not be guaranteed that their commercial was being viewed by a household watching a particular channel. In addition, this is a capability that is not present in the installed base of conventional addressable set-top converters.

The other approach is to bypass the local storage of any demographic data, and instead just transmit a list of receiver addresses belonging to a certain class, followed by a control signal transmission (e.g. if class 1, then switch to channel 10). U.S. Pat. No. 4,331,974 issued May 25, 1982 to Ned W. Cogswell, Gerald J. Eskin and Andrew Wright, Jr. for Cable Television With Controlled Signal Substitution takes this approach.

Three pieces of information are transmitted to the home: normal television channel, the substitute channel used for transmitting the substitute commercial, and the list of household addresses to respond to the substitution. To overcome the burdens of real-time transmissions, the data is split into two pieces and transmitted separately. Prior to the commercial, an event number and the list of households to be effected by each substitution is transmitted and stored. The households can be considered as members of an 'event set'. This step requires large amounts of data to be transmitted. The specifics of a given substitution (event number, normal television channel, the substitute channel used for transmitting the substitute commercial) are transmitted immediately prior to the commercial break, and processed in real-time at each household. Thus, real-time targeting of commercials can occur. In addition, unlike Freeman's invention, advertisers can control which households receive a given commercial advertisement.

The system also includes a method for gathering demographic/psychographic information-scanner purchase statistics collected from specially wired stores in the viewing area.

This approach suffers from a number of limitations, however. First, changing the selection profile (which households are selected) requires a retransmission of the event set. This may not be possible in the change is made close to when commercial broadcast occurs. Second, it is inefficient. Cogswell's approach must transmit a list of household addresses for each different selection profile utilized. Since most selection profiles will be comprised of different 'slices' of a fairly small set of demographic/psychographic parameters (e.g. name, address, zip, age, occupation, household income, . . . ), great redundancy in data transmission exists in Cogswell's approach. Third, a powerful computer in the head-end is needed to sort demographic/psychographic data and generate the lists of households which will receive a given advertisement. Lastly, Cogswell's approach relies to a large extent on information volunteered by and collected directly from panelists. Problems with this approach include: the logistical headache and expense of gathering information from large numbers of viewers and invalid data (incomplete/incorrect information provided by viewers). This is again a special system, not compatible with the installed base of set-tops.

SUMMARY OF THE INVENTION

The present invention combines communications and computer technology to download often used demographic/psychographic information about each household from the cable head-end to the set-top converter. Once stored at the set-top, this information is compared to the selection profile and used to determine which channel to switch to in real-time. Demographic/psychographic data changes relatively infrequently—and is easily updated to reflect new behaviors or supplemented through the addition of new parameters.

This approach removes the limitations of the prior art. First, the selection profile can be dynamically varied from the head-end up until transmission time (immediately prior to commercial broadcast). Second, transmission requirements are reduced. Instead of a complete list of authorized addresses being transmitted, only a selection profile is typically transmitted. This reduces transmission since targeted advertising will often utilize the same demographic/psychographic parameters. Thus, transmission requirements can be reduced by storing each household's demographic and psychographic data at the set-top and only transmitting the selection profiles. Thirdly, the decision of which houses are to be included in a selection profile is downloaded to and processed by each household's receiver. Thus, head-end computer requirements are minimized, instead utilizing the processing power already resident in each microprocessor-based household receiver. Fourthly, a well-defined audience can be guaranteed to advertisers. Lastly, no infrastructure problem exists with creating the segmentation information—it already exists. Among the sources: more than 15,000 mailing lists already utilized in direct mail and magazine advertising.

Objects and Advantages

Media buyers have long desired improved addressability (targeting a desired audience with minimal waste) and accountability (measuring the response with actual purchasing behavior so as to allow optimization of ads) for their advertisements.

This capability already exists in direct mail and even magazine publishing. For example, print technology now allows the content of magazine advertisements to be customized on a subscriber-by-subscriber basis, using demographic/psychographic information compiled on the reader. Similarly, direct mail marketeers can choose from more than 15,000 mailing lists to target audiences. These mailing lists are produced by professional data gathering/manufacturing companies such as Dun and Bradstreet, and are compiled from prior mail-order purchase records, or magazine circulation data. Tracking sales resulting from direct response marketing ads improves accountability.

Mysteriously, while magazine publishers and direct mail providers are making great strides in improving the effectiveness of their medium, television advertising has advanced little if at all.

The major shortcomings of tv advertising: 1) television advertising is not accountable-advertisers have little idea whether their advertising is effective 2) television advertising is not addressable (tv is a 'broadcast' technology-all viewers of a channel get the same programming regardless of how good a 'prospect' they are). Both shortcomings must be corrected if advertisers are to avert wasting most of the nearly $25 billion spent on US television advertising annually.

ADVANTAGES OF ADDRESSABILITY

Alvin Toffler, author of *The Third Wave* concluded, "The mass market has split into ever-multiplying, ever-changing sets of mini-markets that demand a continually expanding range of options, models, types, sizes, colors, and customizations."

John Naisbitt in his book *Megatrends* echoes Toffler's views adding "Advertisers are forced to direct products to perhaps a million clusters of people who are themselves far more individualistic and have a wide range of choices in today's world. The multiple-option society is a new ballgame, and advertisers know that they must win consumers market by market . . . "

The advantages of addressable television advertising extend to broadcasters, advertisers, video distributors, and viewers:

Advertisers

The benefits of addressability extend to virtually any advertiser. For example:

Manufacturers of Mass-Market Items: These marketeers
could target the message a given household receives
based on brand usage. For example, consumer goods
companies like Procter and Gamble, Colgate,etc.
could segment viewers into loyal brand users, competitive brand users and non-brand users—directing a
different advertising message to each. Until the present invention, this was impossible to perform with television advertising.

Manufacturers of Specialty Goods/Services: Many businesses produce goods/services targeted at too small a market for conventional tv broadcast advertising to be cost-effective. Examples might include semiconductor companies that wish to direct advertising to computer design engineers (it would also be possible to purchase blocks of time to run a tutorial on new chips for a fraction of the cost of teaching nationwide seminars). A manufacturer of personal computers could target computer magazine subscribers, corporate MIS employees, or others with a predisposition to the product. Firms that specialize in providing credit cards to those with poor credit histories might only send their ads to those who recently declared bankruptcy and skip well-to-do viewers. A manufacturer of arthritis drugs might target only those over 65 and users of prescription pain-killing medications. By making previously indivisible advertising time divisible, addressability allows advertisers of specialty goods to target only the desired audience, the remainder of the audience can be sold to another advertiser. Until the present invention, this has been impossible to accomplish.

Local Small Businesses: Addressability opens television advertising to small businesses. For example, a dry cleaner probably can't currently use television advertising cost-effectively. Most of his business comes from the neighborhood around his store, and much of the large audience delivered by a commercial on a local television station is wasted. But if the dry cleaner could select only those users who live around his store to receive the ad, it would be cost effective.

Charities: Receptivity to pleas for donations could be measured in many ways. As one example, using a selection profile of prior donations could drastically improve the cost effectiveness of fund-raising activities.

Broadcast Networks

Broadcasters can command higher total advertising fees by splitting audiences, selling the pieces for an amount greater than the previously indivisible whole. For example, suppose a consumer goods company purchases commercial time to advertise diapers. The first level of selection is to send the diaper commercials only to young couples having children (this information is already gathered by major diaper companies by studying hospital records). The consumer goods company can get nearly all the target customers in the audience, for a fraction of the cost. The broadcast network could then sell the other households outside the select group to other advertisers.

The target diaper customers can be further subdivided based on their known brand preferences. For example, suppose there are two diaper brands available. The first commercial alternative targets loyal brand users of the advertiser's brand. The second alternative targets a competitor's brand. The third alternative is to first time diaper buyers. Thus, the network can also sell multiple commercial transmission options to a single advertiser.

Cable System Operators

Cable television system channel capacities have steadily increased, and now approach 1 GHz. However, effective means of utilizing this bandwidth has not kept pace: the amount of quality, revenue producing program material is limited. Accordingly, cable operators would welcome the opportunity to carry additional commercial alternatives for a fee from the broadcast networks.

In addition, the present invention promises to shift the balance of power between cable system operators (the predominant video distribution mechanism employed in the United States) companies and broadcasters. Cable system operators could utilize the technology to effectively insert their own commercials into network broadcasts. Most viewers don't care which commercials they see. For a reduced cable bill, many would undoubtedly assign rights to the cable operator to remotely switch channels to another commercial alternative, provided the cable operator switched them back to the program they were watching after the commercials were over. Cable operators could thus effectively insert their own commercials, and tap a large untapped revenue source: advertisement.

Viewers

Viewers receive relevant product advertisements.

ADVANTAGES OF ACCOUNTABILITY

By tracking the changes of demographic and psychographic information (e.g. purchase behavior), the effectiveness of their advertising (and their competitors') can be quantified. This has ramifications in several areas: 1) advertisers can test ads, using addressability to find the group that responds best to a given ad and 2) advertising campaigns can be designed around long-term management of customers, changing advertisements targeted to a given viewer in response to changes in the purchase record, or dynamically varying the "ad mix" in response to competitor's moves.

When combined with the two way capabilities already present in some cable television systems, it will be possible to record what advertising is actually viewed by the household. This information (viewing habits) could then be used to more precisely define the effectiveness of advertising.

It is therefore the object of the present invention to increase the addressability and accountability of television programs and commercials, through targeting of audiences. And, more generally, to detail methods by which any communication system can target audiences with arbitrary demographic/psychographic profiles.

A system for selective transmission of a message to subscribers of a cable television service in accordance with the invention has a cable network and a head end transmitting system connected to the cable network. As used herein, the terms "television" and "cable television service" are used in a broad sense to include future digital video systems in which information is transmitted by a network, including a hybrid system incorporating elements of present day television and present day personal computers. The system of this invention is also usable with distribution systems that do not rely on a physical cable, such as direct broadcast satellite systems. A plurality of cable decoders, one for each of the subscribers, is connected to the cable network. A means at the head end transmitting system stores demographic/psychographic information about the subscribers and transmits the demographic/psychographic information for each subscriber to the one of the plurality of cable decoders for that subscriber, free of input by the subscribers. A means at each one of the plurality of cable decoders stores the demographic/psychographic information for each subscriber. A means at the head end transmitting system transmits a demographic/psychographic profile for desired recipients of the message and transmits the message. A means at each one of the plurality of cable decoders compares the demographic/psychographic profile with demographic/psychographic information stored at that one of the plurality of cable decoders and enables that one of the plurality of cable decoders to provide the message to that one of the subscribers corresponding to that one of the plurality of cable decoders when the transmitted demographic/psychographic profile matches the stored demographic/psychographic information.

In the method for selective transmission of a message to subscribers of a cable television service, the service includes a cable network, a head end transmitting system connected to the cable network, and a plurality of cable decoders, one for each of the subscribers, connected to the cable network. Demographic/psychographic information about the subscribers is stored at the head end. The demographic/psychographic information for each subscriber is transmitted to the one of the plurality of cable decoders for that subscriber, free of input by the subscriber. The demographic/psychographic information for each subscriber is stored at the decoder. A demographic/psychographic profile for desired recipients of the message is transmitted. The message is transmitted. The demographic/psychographic profile is compared with demographic/psychographic information stored at that one of the plurality of cable decoders. That one of the plurality of cable decoders is enabled to provide the message to that one of the subscribers corresponding to that one of the plurality of cable decoders when the transmitted demographic/psychographic profile matches the stored demographic/psychographic information.

BRIEF DESCRIPTION OF THE DRAWINGS

FIG. 3 is a diagrammatic illustration of a typical channel selection sequence when using the preferred method of the present invention.

FIG. 4 is a diagrammatic illustration of a typical channel selection sequence when using a cascaded barker channel implementation of the invention.

FIG. 5 is a diagrammatic illustration of a typical channel selection sequence when using multiple same channel events, each with a different barker channel.

FIG. 6 is a diagrammatic illustration of a typical channel selection sequence when using a reverse barker implementation of the invention.

FIG. 7 is a diagrammatic illustration of a typical channel selection sequence when using a multiple network, shared advertisement time implementation of the invention.

DETAILED DESCRIPTION OF THE INVENTION

System Block Diagram—Preferred Embodiment

Figure 1A:
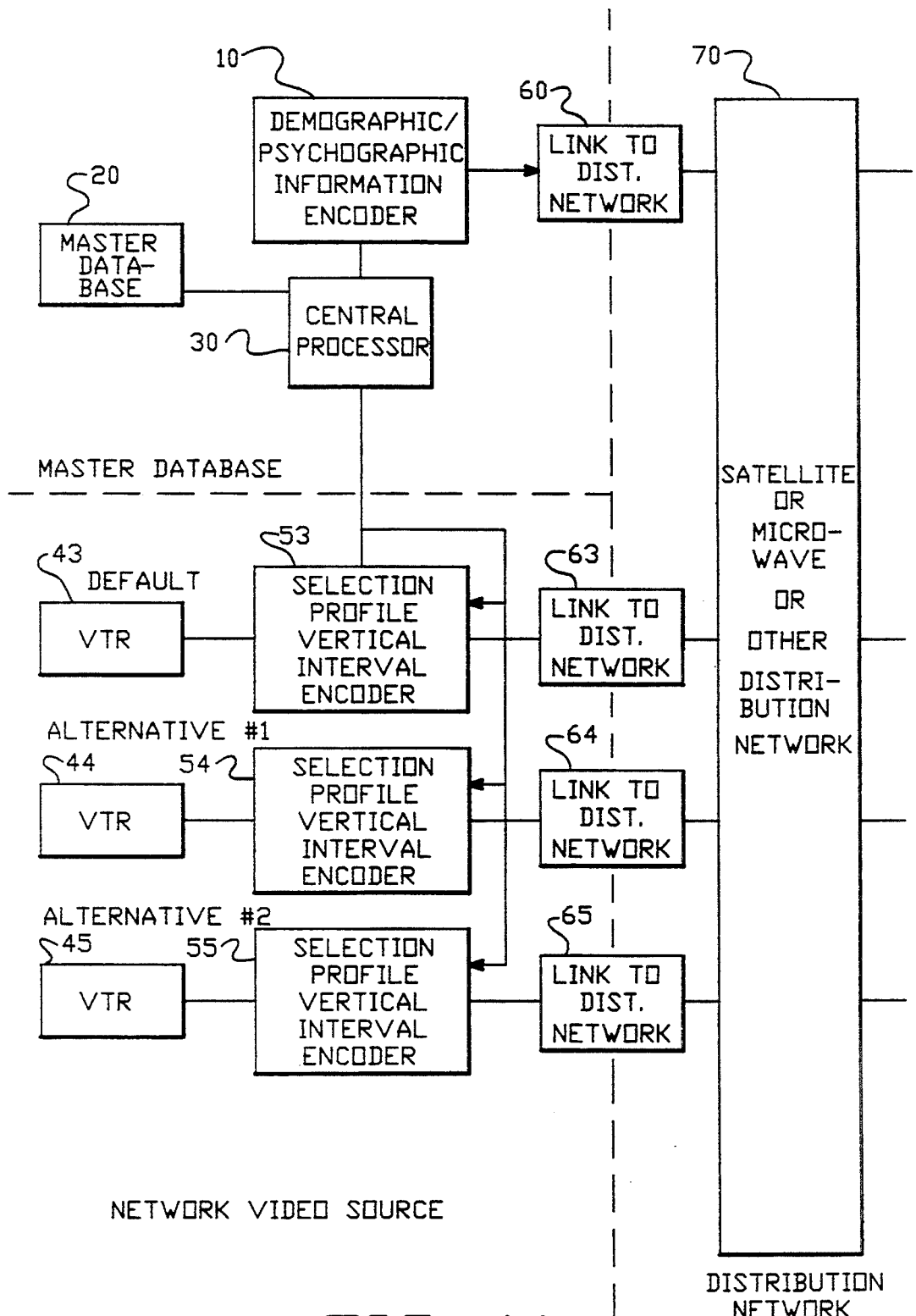
FIGS. 1A and 1B are an overall system block diagram of the preferred embodiment of my invention, as it relates to targeting of television audiences.
Figure 1B:
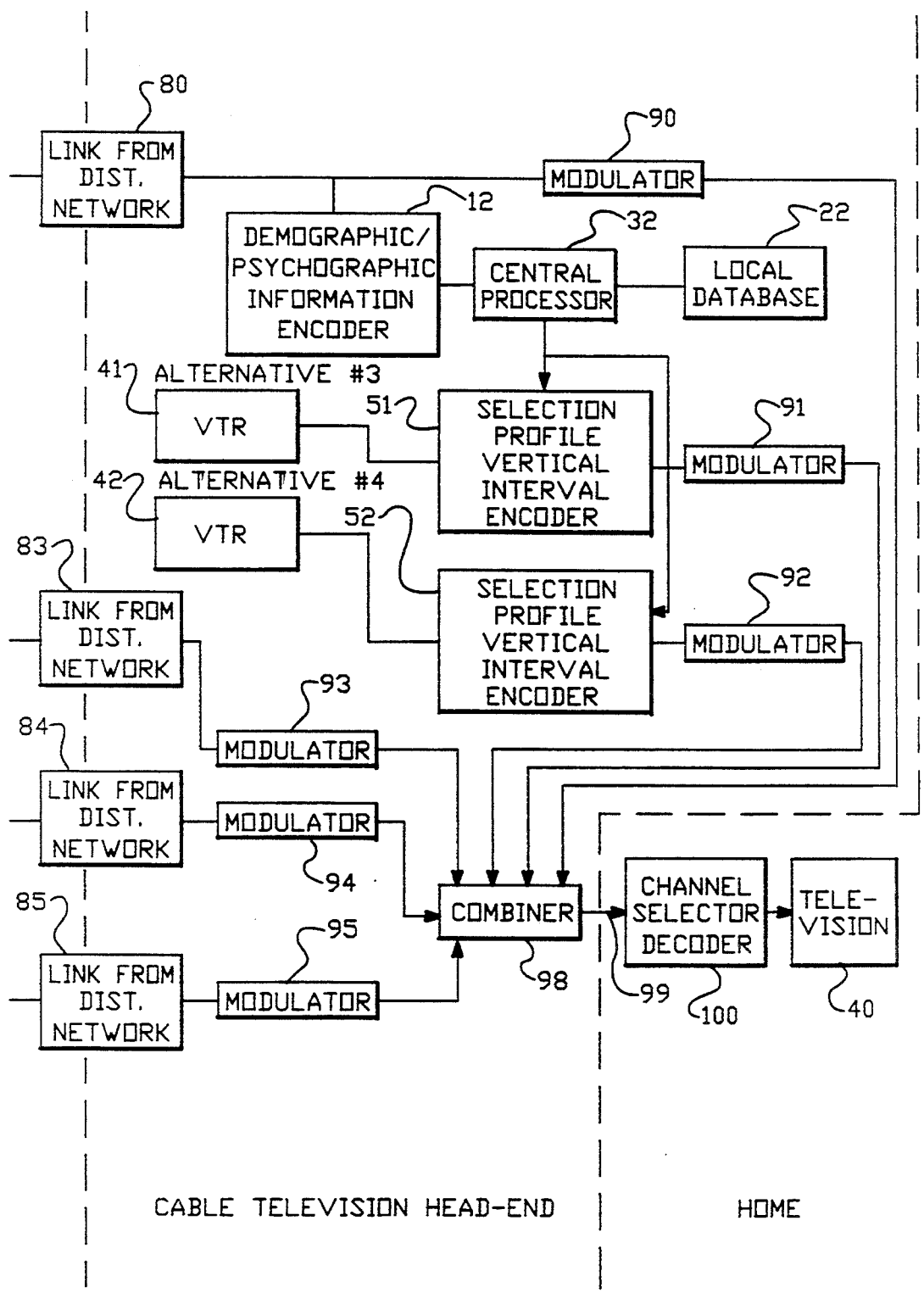

As shown in FIGS. 1A and 1B, the preferred embodiment of the targeted television system is comprised of five major subsystems: master database, network video source, distribution network, cable television head-end, and home.

Master Database:

The master database is comprised of three components: central processor 30 master database 20 and demographic/psychographic information encoder 10.

The purpose of the master database is twofold: to accept and store the value of demographic/psychographic parameters (used to determine which audience members are in the target audience) for each audience member, and to encode this demographic/psychographic information for distribution to the appropriate cable head-end, and ultimately, for storage in each household's channel/selector decoder 100.

The master database 20 can be compiled from a variety of sources. Externally provided information includes compiled lists (e.g. supermarket scanner data, consumer credit information), publication lists (a byproduct of the readership of trade publication), or responder lists (consisting of mail-order buyers). Many other lists such as association membership rosters, are also available. Internally generated data can also be used (name, street, zip code, converter address, etc.). The master database is thus composed of demographic and psychographic about each television household, or even about individual members of the household. Naturally, the database should be flexible enough so that new parameters can be added or deleted from the database as needed.

If the demographic/psychographic parameters utilized for targeting have not previously been downloaded to the channel/selector decoder 100, the central processor 30 reads the database records for each audience member, and passes the audience member id number, and the value of the demographic/psychographic parameter of interest to the demographic/psychographic information encoder 10.

The demographic/psychorgraphic information encoder 10 encodes the information and transmits it to the distribution network 70 via link to distribution network 60.

Network video source:

Programs/Commercials can come from a bank of videotape machines with prerecorded footage. Video tape recorder 43 contains the default programming and commercials. Video tape recorder 44 and video tape recorder 45 contain nationally-originating alternative commercials. Video tape recorder 43 produced a video signal that is passed through a vertical interval encoder 53 used to insert selection profile/instructions into the vertical interval immediately prior to the start of each commercial. Similarly, vertical interval encoder 54 and vertical interval encoder 55 insert selection commands into the vertical interval of signals from video tape recorder 44 and video tape recorder 45, respectively.

Commercial alternatives can arrive at the cable television head-end from multiple sources. Cable systems receive advertisements from networks or their affiliates via satellite or microwave or other distribution network, 70. Additional advertisements originate in-house (i.e. local cable originated advertising—see FIG. 1).

Distribution Network:

The distribution network 70 is the means by which default programming and the alternative commercials are transmitted from the network video source to the cable television head-end. The distribution network can be implemented by satellite, microwave, fiber optics or other methods. Both the demographic/psychographic information and default programming and alternative commercials must be transmitted.

As previously mentioned, the encoded demographic/psychographic information is connected to the distribution network 70 by link 60, and connected to the cable television head-end by a link from the distribution network, 80. The default programming is linked from the network video source to the distribution network via 63, and alternative commercials are transmitted via a link 64 and 65. While only two alternatives are shown, this is of course an arbitrary choice.

Cable Television Head-end:

Many modern cable systems have more bandwidth (and channel capacity) than the availability of quality programming. Current cable systems can often support 650+ MHz, or over 100 channels of programming. The present invention uses the spare bandwidth available on many cable systems to distributed multiple program/commercial alternatives for a given channel.

This is accomplished by placing each commercial alternative on a different channel (see FIG. 3). These spare channels can come from existing unused capacity, or by converting marginal uses of existing channels (stock ticker, barker channel info, etc.), or sharing an already assigned channel (sharing a community access channel when not in use).

Three types of video signals are distributed to the homes of subscribers: default programming/commercials, alternative commercials, and demographic/psychographic information.

The cable television head-end receives the demographic/psychographic information, and identifies data pertaining to subscribers of that particular cable system. This information is then both decoded (by demographic/psychographic information decoder 12) and locally stored (in local database 22). This information is also transparently encoded into video and shifted to the appropriate cable television distribution channel by modulator 90.

Default programming/commercials are received on link from distribution network 83, and shifted to the appropriate cable television distribution channel by modulator 93. Although only one channel is shown in FIG. 1, this is equal to the number of different programming sources.

Commercial alternatives are received by link from distribution network 84 and 85, and shifted to the appropriate cable television distribution channel by modulator 94 and 95 respectively. In addition, in-house commercial alternatives can also be placed on the cable television distribution network. VTR 41 and 42, and as before, selection profile vertical interval encoders 51 and 52 encode commands that will be used to specify the desired audience. Once encoded, these local alternatives are placed on the cable at appropriate RF values by modulator 91 and 92. The number of alternative commercials is limited by system bandwidth and the wishes of the broadcaster.

The default programming, commercial alternatives (both locally and nationally provided), and demographic/psychographic information are sent to combiner 98 and then sent to the homes of cable subscribers via cable television distribution network 99.

Home:

Cable subscribers receive the default programming/commercials, alternative commercials, and demographic/psychographic information via cable television distribution network 99. The home contains a channel selector/decoder 100 which has three functions:

monitor demographic/psychographic channel for information about that household, and decode and store it monitor the vertical interval of the channel being viewed to obtain the selection profile commands 'compare' the household's demographic/psychographic information to the selection profile and switch to the appropriate viewing channel.

The selected channel is viewed on television 40.

Channel Selector/Decoder

Figure 2:
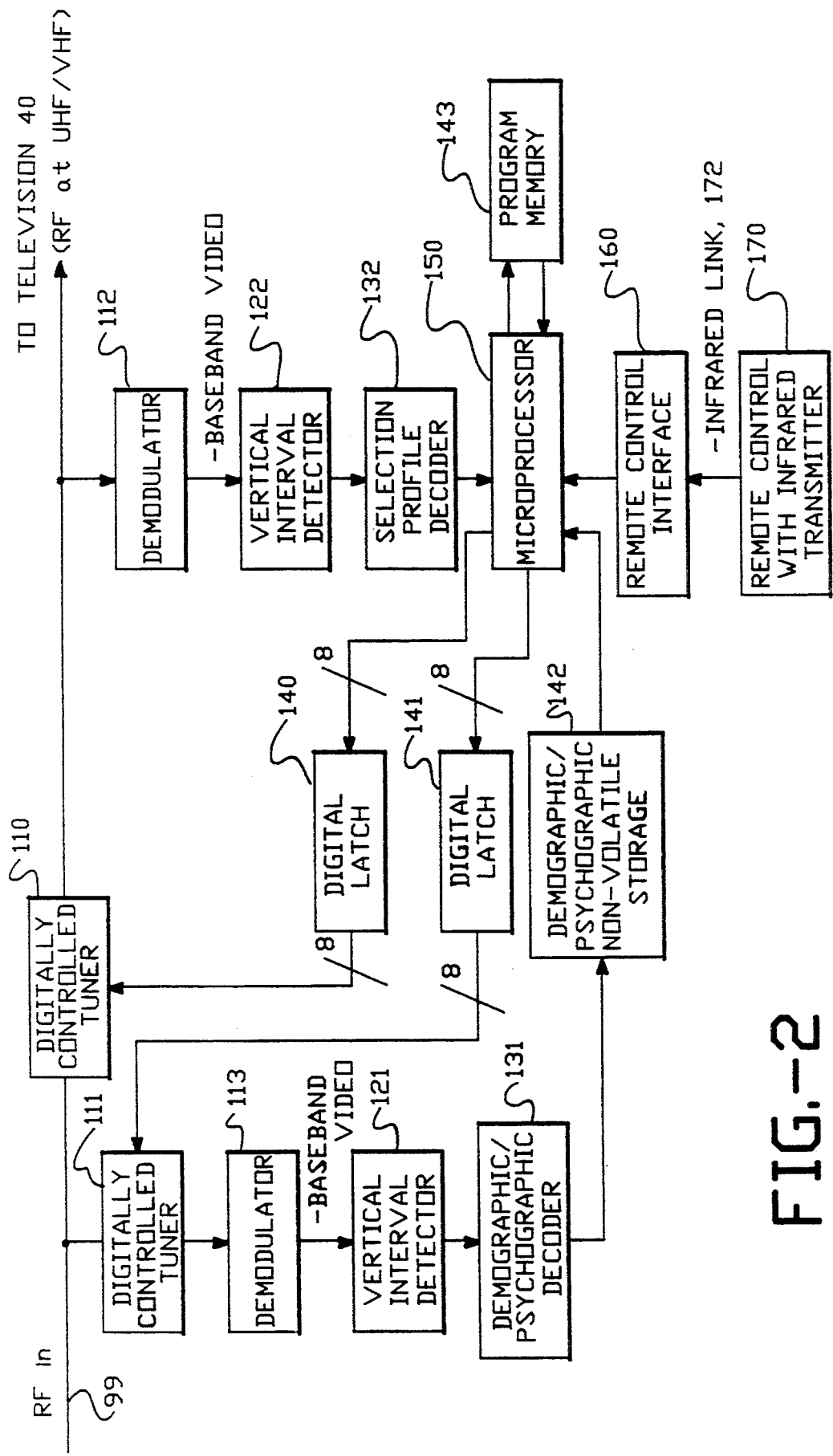
FIG. 2 is a block diagram of the channel selector/decoder labelled 100 in FIG. 1B.

The channel selector/decoder is shown in more detail in the block diagram of FIG. 2.

Display Channel Selection:

The RF is received on the cable television distribution network 99. The channel to be shown on the viewer's television 40 is mixed down to the appropriate channel frequency (typically channel 3 or 4) by digitally controlled modulator 110. The channel to be shown is set by an 8-bit value written to digital latch 140. Because microprocessor 150 can write to digital latch 140, the appropriate channel frequency can be readily varied, if desired.

The channel viewed is determined by one of two sources: the viewer's channel selection or selection profile commands. The latest command from either source overrides the previous channel setting.

Thus, a remote control interface 160 provides the viewer's channel selection, entered via an infrared link 172 from remote control with infrared transmitter 170. Selection profile commands can override it and cause the channel to be changed transparently to the user. When a selection profile command is detected on the currently viewed channel by selection profile decoder 132, Microprocessor 150 retrieves the appropriate demographic/psychographic data from demographic/psychographic non-volatile storage 142 and determines the validity of the 'if' portion of the if-then clauses comprising the selection profile commands. If true, the command is executed, and the viewer's selection may be overridden.

Similarly, whenever a *new* channel is entered by the viewer from remote control with infrared transmitter 170, it overrides any previous setting.

Local Demographic/Psychographic Data Storage:

The digitally controlled demodulator 111 tunes in the demographic and psychographic information channel generating baseband video. Because microprocessor 150 can write to digital latch 141, the channel carrying the demographic/psychographic information can be readily varied.

The vertical interval detector 121 strips the encoded information from the baseband video signal. A typical transmission would include the household's identification number, demographic/psychographic data values, and address locations to store the values. For example, 100000,60000,1000 might signify that the household with id number 100000 has a household income of $60,000, and that the value for household income should be stored at location 1000. Naturally, many other schemes are possible for transmitting and storing both numeric and non-numeric data types (e.g. income could be broken into categories <$20,000=category 1, $20,000–$60,000=category 2, >$60,000=category 3, or non-numeric brand preference can be expressed numerically: brand A=category 1, brand B=category 2, .

. . ). The demographic and psychographic decoder 131 analyzes the output of the vertical interval detector 121, writing demographic/psychographic data corresponding to the household's identification number to demographic/psychographic non-volatile storage 142.

Selection Profile Decode:

The output of digitally controlled modulator 110 is also brought to baseband video by demodulator 112. The vertical interval detector 122 strips the encoded information from the baseband video signal. The selection profile decoder 132 interprets and reformats the stream of data coming from vertical interval detector 122, so it can be read properly by microprocessor 150. A typical selection profile command will consist of a set of if-then statements (e.g. if household income >$50,000 then switch to channel 3). A variety of schemes for transmitting these commands exist.

Example of Targeted Television Advertisement

FIG. 3 shows an example of a targeted television advertisement, as it might be applied to automobile advertising. One important demographic factor correlating with car purchases is household income. Note: It is assumed that the demographic/psychographic data needed to determine the validity of each selection profile command has already been downloaded.

A viewer watches Program segment 200 on ch. 2. Immediately prior to commercial time, a selection profile command 210 is transmitted. It offers three commercial alternatives depending on houshold income: 1) if household income <$20,000 then switch to channel 4 and view Hyundai Excel advertisement (commercial alternative #2 222) 2) if household income is $2,000–$60,000 then stay tuned to channel 2 for Ford Mustang advertisement (default commercial 224) 3) if household income >$60,000 then switch to channel 5 for Mercedes 500SL advertisement (commercial alternative #1 220).

At the end of each of these advertisements, a selection profile command is issued to return to the original channel to view the program selected by the viewer. Thus, channel 5 has a selection profile command 230 ordering a return to channel 2. Likewise, channel 4 has a selection profile command 232 ordering a return to channel 2. Similarly, channel 2 has a selection profile command 234 ordering to stay tuned to channel 2. After execution of these selection profile commands, viewers are returned to ch. 2 to watch program segment 240.

To speed the widespread adoption of the present invention in the cable television industry, two design objectives should guide its implementation:

1) Minimize incompatibilities (both hardware and software) with the existing installed base of set-top converters.

Requiring a special set-top converters (as implemented in the original embodiments) would cost a cable operator approximately $80–150/household—a prohibitive upfront cost to support targeted television advertising. In addition, incompatibilities in system software could require cable operators to go through costly and time-consuming software upgrades.

2) Minimize channel capacity demands.

Although likely to expand rapidly as fiber optic transmission and digital video compression become cost effective, channel capacity is currently a scarce resource in many cable systems. Any implementation of the invention should attempt to efficiently use channel capacity.

To overcome the first limitation, existing addressability capabilities, originally developed for pay-per-view events can be utilized. Pay-per-view technology commonly uses a system of program tags to determine which pay-per-view events a particular set-top is authorized to display. In this approach, each pay-per-view event is assigned a tag number. Prior to broadcast of the event, authorized set-tops are sent a message which includes the tag number for the event. These tags are stored in memory in the set-top converter. At the time of broadcast, the event number is transmitted. The set-top compares the transmitted event number to those it has stored. If the set-top finds a match, it has been authorized for the event and is allowed to continue to tune to the pay-per-view channel. If the tag is not matched, the set-top is not authorized to view the channel and is commonly commanded to tune to another physical channel (usually referred to as the barker channel). In turning to the barker channel, the set-top is actually overriding the viewer's command This override typically does not change the channel number displayed on the set-top converter, and is somewhat transparent to the viewer. The barker channel is usually used to display an advertisement on how to order the pay-per-view event the subscriber has attempted to view.

The present invention can be implemented using this existing pay-per-view capability, providing backward compatibility with a large installed base of addressable set-top converters already in use in the cable television industry. In this approach, the demographic information is cast as program tags and downloaded to the set-tops. Different demographic groups are defined by different program tags. By properly specifying each event's start time end time, event channel and barker channel number, it is possible to implement the invention and segregate the viewing audience into demographic groups watching different commercial alternatives on different physical channels. In fact, there are several methods to implement the invention. Those skilled in the art will recognize that both in-band and out-of-band data transmission can be used in the implementations discussed below.

One such method, as shown in FIG. 4, would use cascaded barker channels. Let us again consider the car advertisement example. Household income defines three demographic groups, which are split into three tags (e.g. 02=0–$20,000, 28=$20–$80,000, and 81>$80,000. This information could be stored with arbitrary resolution, to fit the needs of the advertiser). The demographic group with household income between $20–$80,000 would receive the Ford Mustang commercial and would be authorized for event 28. Similarly, those with household income of less than $20,000 would receive the Hyundai commercial and would be authorized for event 02. Those demographically targeted to receive the Mercedes advertisement would receive authorization to view event 81.

| Demographic Group (Household Income) | Targeted Advertisement | Event Authorizations |
|---|---|---|
| <$20,000 | Hyundai | 02 |
| $20–80,000 | Ford | 28 |
| >80,000 | Mercedes | None |

The program events are as follows:

| Program Tag | Program Channel | Barker Channel |
|---|---|---|
| 28 | 2 | 4 |
| 02 | 4 | 5 |

As before, the entire viewing audience is watching program segment 300 on Ch. 2 prior to the targeted television advertisement. Immediately prior to the targeted advertisement, the head-end transmits a selection profile command 310, message that program event 28 on channel 2 is starting and has barker ch. 4. Those viewing the Ford Mustang advertisement (default commercial 324) would remain tuned to ch. 2. The Hyundai and Mercedes viewers would be sent to the specified barker channel (ch. 4). Selection profile command 305 is also transmitted (program even 02 is starting on ch. 4, barker ch. 5). Those with household incomes of less than $20,000 would stay tuned to ch. 4 to view the Hyundai advertisement, commercial alternative #2 322. The demographic group with household income in excess of $80,000 would be sent to the barker channel (ch. 5 in the example) to view the Mercedes advertisement, commercial alternative #1 320. At the end of the commercial, all program events are ended, and the unauthorized set-tops are cascaded back via selection profile command 330, 332, and 334 to the original channel (Ch.2) from the barker channels for the next program segment, 340.

Cascading barker channels would allow an audience to be split into N groups, using N-1 barker channels.

Another approach, shown in FIG. 5, uses overlapping pay-per-view events. Those receiving the Ford Mustang commercial, default commercial 424, would be authorized for event 02 and 81. Those receiving the Hyundai commercial (commercial alternative #2 422) would not be authorized for any events. Those demographically targeted to receive the Mercedes advertisement (commercial alternative #1 receive authorization to view even 02, but not 81. authorization to view event 02, but not 81.

In summary, the event authorizations are:

| Demographic Group (Household Income) | Targeted Advertisement | Event Authorizations |
|---|---|---|
| <$20,000 | Hyundai | |
| $20–80,000 | Ford | 02,81 |
| >80,000 | Mercedes | 02 |

The program event definitions are as follows:

| Program Tag | Program Channel | Barker Channel |
|---|---|---|
| 02 | 2 | 4 |
| 81 | 2 | 5 |

At the start of program events 02 and 81, selection profile commands 405 and 410 are transmitted. Households with less than $20,000 household income are transferred to barker channel (ch. 4) to view the Hyundai ad (commercial alternative #2 422). Similarly, viewers with more than $80,000 household income are transferred to barker channel (ch. 5) to view the Mercedes ad (commercial alternative #1 420). Those with household income between $20–$80,000 view the Ford advertisement, default commercial 424. Program events 02 and 81 are ended with selection profile commands 430, 432 and 434, causing all viewers to return to ch. 2 for the next program segment 440.

A reverse barker channel approach can also be implemented as shown in FIG. 6. In this approach, the event authorizations are:

| Demographic Group (Household Income) | Targeted Advertisement | Event Authorizations |
|---|---|---|
| <$20,000 | Hyundai | 81 |
| $20–80,000 | Ford | 02,81 |
| >80,000 | Mercedes | 02 |

Prior to the targeted advertisements, selection profile commands 501 and 502 are transmitted which effectively turn Ch.2 into a barker channel. The program events are as follows:

| Program Tag | Program Channel | Barker Channel |
|---|---|---|
| 02 | 4 | 2 |
| 81 | 5 | 2 |

Immediately prior to the targeted advertisement, additional selection profile commands 509 and 510 are transmitted ending events 02 and 81. This "returns" households with income less than $20,000 to ch. 4 for the Hyundai advertisement (commercial alternative#1 522) and those with incomes greater than $80,000 to ch. 5 to view Mercedes advertisement (commercial alternative #2 520). (Because of the peculiarities of certain set-top converters, these switches are made even though all viewers are initially tuned to ch. 2 NOT ch. 4 or Ch. 5).

After the targeted advertisements are viewed, and prior to the next program segment 540, selection profile commands 530, 532, and 534 are transmitted which serve to return all viewers to Ch.2 for the next program segment 540. Selection profile commands 530, 532, and 534 could be defined by program tags corresponding to the demographic profiles to be used in the next targeted advertisement.

It is also possible to manipulate channel maps (in essence a look-up table that instructs a set-top which physical channel corresponds to the virtual channel shown on the numeric display on the set-top). The set-top stores both a default and a demographic channel map. At the time of the targeted television advertisement, the set-top is instructed to switch to its alternative channel map, effectively mapping viewers to their demographically defined advertisement. At the end of the targeted advertisement, set-tops are instructed to return to the default channel map.

For the car advertisement example outlined above, the channel maps could be:

| Virtual Channel | Default ($20-80K) Channel Map | $0–20,000 Channel Map | $80,000+ Channel Map |
|---|---|---|---|
| 02 | Ford Mustang ad | Hyundai ad | Mercedes ad |
| 03 | | | |
| 04 | Hyundai ad | Mercedes ad | Ford ad |
| 05 | | | |
| 06 | Mercedes ad | Ford ad | Hyundai ad |

It is also possible to make use of a parental control function provided with existing cable decoders to achieve equivalent results.

Potential incompatibilities caused by system software must also be overcome. One such problem arises in using pay-per-view event tags. These events are often scheduled only at a resolution of one minute, too coarse for targeted television of shorter advertising. This creates problems because the cable head-end will only transmit program start and program end information at one minute intervals (eliminating the possibility of 15 or 30 second advertisements). A simple work-around would involve tricking the addressable control system computer into believing that a minute had passed when in fact only 30 seconds had elapsed. The example shown below illustrates how a 30 second event could be implemented. Prior to program start, a one-minute event is defined. At the specified time, the program start message is sent to the set-tops. After 30 seconds of the event, the addressable control system computer clock is updated to one minute. This triggers an end program message to be sent to the set-tops. Sometime after the event end (01:00 of actual elapsed time in the example below), the control system computer clock is reset to the actual elapsed time:

| Actual Elapsed Time | Time Sent To Controller | Controller Action |
|---|---|---|
| 00:00 | 00:00 | Start Program |
| 00:30 | 01:00 | End Program |
| 01:00 | 01:00 | Resync time |

It should also be noted that system software could be easily modified to remove this constraint and allow transmissions (and program start and end) to be controlled to second or even subsecond accuracies.

While advances in fiber optics and digital video compression promise major increases in channel capacity, it is today a very limiting factor that must be addressed. One approach is to use the technology to target viewers at only a trunk-by-trunk or system-by-system basis. The demographics of this larger group (i.e. system or trunk level) are compared to that desired by the advertiser. Systems (or trunks) that have large numbers of viewers of the desired demographic group could then be effectively targeted. The benefits are two-fold. First, since only one alternative is sent to each home, no incremental channels are required. Second, the approach is compatible with all existing addressable and non-addressable set-top converters. The primary limitation of this technique is that targeting is not defined at the household level. Even this rather limited implementation of the present invention offers advertisers a much finer degree of control with television advertising than available with over-the-air broadcasting.

It is important to note at the outset that channels used for targeting need not be dedicated. It is possible to share channels that carry other programming at other times. Examples include community access stations, cable networks with limited time program offerings, or pay-per-view channels with dead-time between features.

It is also possible to circumvent channel capacity constraints by buying advertising time on more than one network. If an advertiser is primarily interested in splitting the audience of a major network (say NBC), said advertiser would also buy simultaneous ad time on less expensive cable networks with smaller audiences. An approach such as that outlined in FIG. 3, 4, 5 or 6 could be employed. The major network would be the base channel (Ch. 2 in the figures); the viewers of the major network would be sent either Ch.4 or Ch.5 at ad time as defined by the demographics. Viewers of the cable network on Ch. 4 would remain on Ch. 4 or be sent to Ch.5 at ad time, as defined by the demographics. Viewers of the cable network on Ch. 5 would remain tuned to Ch. 5 at ad time. In this scheme there is no mechanism to get viewers of cable network on ch. 4 to the commercial on Ch.2 Likewise, viewers of the cable network program segment on ch. 5 cannot be sent the ad on either ch. 2 or ch. 4. Thus, the commercials airing on the cable networks will be viewed by audiences larger than that specified purely by the demographics. If the major network audience is much larger than the cable network audiences, the effect of this error will be small.

It is possible to add an extra event (and program tag) so as to eliminate this problem and make sure that viewers of all three channels are sent to the appropriate (as defined by their demographic group) channel for commercial advertisements. As shown, in FIG. 7, an extra program event is added.

The event authorizations are:

| Demographic Group (Household Income) | Targeted Advertisement | Event Authorizations |
|---|---|---|
| <$20,000 | Hyundai | 02 |
| $20–80,000 | Ford | 28 |
| >80,000 | Mercedes | 81 |

The program event definitions are as follows:

| Program Tag | Program Channel | Barker Channel |
|---|---|---|
| 28 | 2 | 4 |
| 02 | 4 | 5 |
| 81 | 5 | 2 |

The approach is similar to the cascaded barker approach mentioned above. The addition of event 81 on Ch. 5 allows a circular assignment, whereby viewers of all three networks are sent to the appropriate advertisement by switching through the channel sequence:

This "circular assignment" ensures viewers are within two channel reassignments (or more generally, N-1 reassignments with N commercials) of the appropriate advertisement.

Another approach to address channel capacity constraints leverages the advanced on-screen display capabilities many new addressable set-tops now support. For example, the Model 8600 from Scientific-Atlanta offers a 240-character (10 line-by-24 column on-screen display) locally resident character generator. The system eliminates the need for a dedicated barker channel. Text-based barker messages are downloaded from the head-end via in-band or out-of-band data transmission and stored locally in the set-top converter. The relatively low speed of the data transmission and limited storage capabilities of current set-tops are acceptable for small text-based files. When attempting to tune a channel that is not authorized, the viewer sees a character-generated barker message originating from the set-top (not transmitted from the head-end).

This capability can also be used for targeted advertising, eliminating channel capacity constraints. It is possible that this technology could allow customization of messages in a manner analogous to direct mail—a viewer's name and other pertinent details would be included in the on-screen personalized message. The primary drawback to this system is that currently the system offers the ability to display only text. It is likely that these capabilities will soon evolve to include local storage of graphic bit-mapped images, and eventually full-motion video.

Two additional technologies promise to drastically increase channel capacity: digital video compression and fiber optic transmission. Compression will allow many video channels to fit into the bandwidth previously occupied by a single channel—thus increasing total channel capacity. The advent of fiber optic transmission schemes such as fiber-to-the home or fiber-to-the-feeder will greatly increase bandwidth (and channel capacity).

While the above description contains many specialties, the reader should not construe these as limitations on the scope of the invention, but merely as exemplifications of preferred embodiments thereof. Those skilled in the art will envision many other possible variations are within its scope. For example, skilled artisans will envision a system employing alternative methods of distributing video, demographic/psychographic data, and selection profile commands to the home. Video programming and alternative commercials might be transmitted on spare UHF/VHF channels, via direct broadcast satellite or fiber optics. Similarly, demographic/psychographic information and selection profile commands might be distributed by the above means, and in addition FM SSB.

In addition, skilled artisans will readily apply this technology to two-way distribution systems, and to the distribution of other media including radio. Accordingly, the reader is requested to determine the scope of the invention by the appended claims and their legal equivalents, and not by the examples which have been given.

What is claimed is:

1. A system for selective transmission of a message to subscribers of a cable television service, comprising:
   a cable network,
   a head end transmitting system connected to said cable network,
   a plurality of cable decoders, one for each of the subscribers, connected to said cable network,
   means at said head end transmitting system for storing demographic/psychographic information about the subscribers and transmitting the demographic/psychographic information for each subscriber to the one of said plurality of cable decoders for that subscriber, free of input by the subscribers,
   means at each one of said plurality of cable decoders for storing the demographic/psychographic information for each subscriber,
   means at said head end transmitting system for transmitting a demographic/psychographic profile for desired recipients of the message and for transmitting the message,
   means at each one of said plurality of cable decoders for comparing the demographic/psychographic profile with the demographic/psychographic information stored at that one of said plurality of cable decoders and for enabling that one of said plurality of cable decoders to provide the message to that one of the subscribers corresponding to that one of said plurality of cable decoders when the transmitted demographic/psychographic profile matches the stored demographic/psychographic information.

2. The system for selective transmission of the message to subscribers of the cable television service of claim 1 in which said means for comparing and enabling in which said means for comparing and enabling is configured to enable that one of said plurality of cable decoders to provide the message by changing a channel to which that of one of said plurality of cable decoders is tuned.

3. The system of claim 2 in which said means for comparing and enabling is further configured to return said cable decoder to the channel to which that of one of said plurality of cable decoders was turned prior to operation of said means for comparing and enabling at a conclusion of the message.

4. The system of claim 3 in which said cable decoder is configured so that a later command from either a viewer's channel selection or said means for comparing and enabling overrides a previous channel selection.

5. The system of claim 1 additionally comprising means at said head end transmitting system for providing alternative messages for the selective transmission.

6. The system of claim 5 in which said means for providing alternative messages is configured to provide the alternative messages on different channels.

7. The system of claim 6 in which said means for comparing and enabling is configured to provide the alternative messages on different channels through an alternative channel map based on the demographic/phychographic information.

8. The system for selective transmission of a message to subscribers of a cable television service of claim 1 in which said plurality of cable decoders each include a display and each of said plurality of cable decoders is configured to provide the message to said display.

9. The system for selective transmission of the message to subscribers of the cable television service of claim 6 in which said means for providing alternative messages is configured so that said cable decoder for a particular subscriber is repeatedly tuned to one of multiple different channels arranged in a circular pattern until said cable decoder for said particular subscriber.

10. A method for selective transmission of a message to subscribers of a cable television service, the service including a cable network, a head end transmitting system connected to the cable network, and a plurality of cable decoders, one for each of the subscribers, connected to the cable network, the method comprising:
   storing at said head end transmitting system demographic/psychographic information about the subscribers,
   transmitting from said head end transmitting system the demographic/psychographic information for each subscriber to the one of the plurality of cable decoders for that subscriber, free of input by the subscribers,
   storing the demographic/psychographic information for each subscriber at the one of the plurality of cable decodes for that subscriber, transmitting from said head end transmitting system a demographic/psychographic profile for desired recipients of the message, transmitting the message, comparing the demographic/psychographic profile with the demographic/psychographic information stored at that one of the plurality of cable decoders, and enabling that one of the plurality of cable decoders to provide the message to that one of the subscribers corresponding to that one of the plurality of cable decoders when the transmitted demographic/psychographic profile matches the stored demographic/psychographic information.

11. The method of claim 10 in which that one of the plurality of cable decoders is enabled to provide the message by changing a channel to which that one of the plurality of cable decoders is tuned.

12. The method of claim 11 in which the cable decoder is returned to the channel to which that one of the plurality of cable decoders was tuned prior to changing the channel.

13. The method of claim 12 in which a later command from a viewer's channel selection or the comparing overrides a previous channel selection.

14. The method of claim 10 in which alternative messages are provided for the selective transmission.

15. The method of claim 14 in which the alternative messages are provided on different channels.

16. The method of claim 15 in which the alternative messages are provided on different channels through an alternative channel map based on the demographic/psychographic information.

17. The method of claim 10 in which the plurality of cable decoders each include a display and each of the plurality of cable decoders provides the message to the display.

18. The method of claim 15 in which said cable decoder for a particular subscriber is repeatedly tuned to one of multiple different channels arranged in a circular pattern until said cable decoder for said particular subscriber is tuned to a channel that is transmitting a message targeted for said particular subscriber.

19. A system for selective transmission of a message to subscribers of a television service, comprising:

a network, a head end transmitting system coupled to said network, a plurality of decoders, one for each of the subscribers, coupled to said network, means at said head end transmitting system for storing demographic/psychographic information about the subscribers and transmitting the demographic/psychographic information for each subscriber to the one of said plurality of decoders for that subscriber, free of input by the subscribers, means at each one of said plurality of decoders for storing the demographic/psychographic information for each subscriber, means at said head end transmitting system for transmitting a demographic/psychographic profile for desired recipients of the message and for transmitting the message, means at each one of said plurality of decoders for comparing the demographic/psychographic profile with the demographic/psychographic information stored at that one of said plurality of decoders and for enabling that one of said plurality of decoders to provide the message to that one of the subscribers corresponding to that one of said plurality of decoders when the transmitted demographic/psychographic profile matches the stored demographic/psychographic information.

20. A system for selective transmission of a message to subscribers of a cable television service, comprising:

a cable network, a head end transmitting system connected to said cable network, a plurality of cable decoders, one for each of the subscribers, connected to said cable network, means at said head end transmitting system for storing demographic/psychographic information about the subscribers and transmitting the demographic/psychographic information for each subscriber to the one of said plurality of cable decoders for that subscriber, free of input by the subscribers, said means for storing and transmitting the demographic/psychographic information being operated to transmit the demographic/psychographic information as program tags, means at each one of said plurality of cable decoders for storing the demographic/psychographic information for each subscriber, means at said head end transmitting system for transmitting the demographic/psychographic profile for desired recipients of the message and for transmitting the message, said means for transmitting being operated to transmit the demographic/psychographic profile as a program tag with the message, means at each one of said plurality of cable decoders for comparing the demographic/psychographic profile with the demographic/psychographic information stored at that one of said plurality of cable decoders and for enabling that one of said plurality of cable decoders to provide the message to that one of the subscribers corresponding to that one of said plurality of cable decoders when the transmitted demographic/psychographic profile matches the stored demographic/psychographic information.

21. A system for selective transmission of a message to subscribers of a cable television service, comprising:

a cable network, a head end transmitting system connected to said cable network, a plurality of cable decoders, one for each of the subscribers, connected to said cable network, means at said head end transmitting system for storing demographic/psychographic information about the subscribers and transmitting the demographic/psychographic information for each subscriber to the one of said plurality of cable decoders for that subscriber, free of input by the subscribers, means at each one of said plurality of cable decoders for storing the demographic/psychographic information for each subscriber, means at said head end transmitting system for transmitting a demographic/psychographic profile for desired recipients of the message and for transmitting the message, means at each one of said plurality of cable decoders for comparing the demographic/psychographic profile with the demographic/psychographic information stored at that one of said plurality of cable decoders and for enabling that one of said plurality of cable decoders to provide the message to that one of the subscribers corresponding to that one of said plurality of cable decoders when the transmitted demographic/psychographic profile matches the stored demographic/psychographic information, and means at said head end transmitting system for providing alternative messages for selective transmission and operated to provide the alternative messages on different channels, said means for comparing and enabling being operated to provide the alternative messages on different channels through cascading barker channels.

22. A system for selective transmission of a message to subscribers of a cable television service, comprising:
a cable network,
a head end transmitting system connected to said cable network,
a plurality of cable decoders, one for each of the subscribers, connected to said cable network,
means at said head end transmitting system for storing demographic/psychographic information about the subscribers and transmitting the demographic/psychographic information for each subscriber to the one of said plurality of cable decoders for that subscriber, free of input by the subscribers,
means at each one of said plurality of cable decoders for storing the demographic/psychographic information for each subscriber,
means at said head end transmitting system for transmitting a demographic/psychographic profile for desired recipients of the message and for transmitting the message,
means at each one of said plurality of cable decoders for comparing the demographic/psychographic profile with the demographic/psychographic information stored at that one of said plurality of cable decoders and for enabling that one of said plurality of cable decoders to provide the message to that one of the subscribers corresponding to that one of said plurality of cable decoders when the transmitted demographic/psychographic profile matches the stored demographic/psychographic information,
means at said head end transmitting system for providing alternative messages for selective transmission and operated to provide the alternative messages on different channels, said means for comparing and enabling being operated to provide the alternative messages on different channels through overlapping pay- per-view events.

23. A system for selective transmission of a message to subscribers of a cable television service, comprising:
a cable network,
a head end transmitting system connected to said cable network and to a master database and a network video source, said master database including means for storing a demographic/psychographic audience database comprising audience demographic/psychographic information, free of input by the subscriber, and means, connected to said means for storing said demographic/psychographic audience database, for selectively transmitting the demographic/psychographic information for the subscribers from said audience database to said head end transmitting system, and said network video source includes means for transmitting alternative messages for the selective transmission to said head end transmitting system,
a plurality of cable decoders, one for each of the subscribers, connected to said cable network,
means at said head end transmitting system for storing the demographic/psychographic information about the subscribers and transmitting the demographic/psychographic information for each subscriber to the one of said plurality of cable decoders for that subscriber, free of input by the subscribers,
means at each one of said plurality of cable decoders for storing the demographic/psychographic information for each subscriber,
means at said head end transmitting system for transmitting a demographic/psychographic profile for desired recipients of the message and for transmitting the message,
means at each one of said plurality of cable decoders for comparing the demographic/psychographic profile with the demographic/psychographic information stored at that one of said plurality of cable decoders and for enabling that one of said plurality of cable decoders to provide the message to that one of the subscribers corresponding to that one of said plurality of cable decoders when the transmitted demographic/psychographic profile matches the stored demographic/psychographic information.

24. A method for selective transmission of a message to subscribers of a cable television service, the service including a cable network, a head end transmitting system connected to the cable network, and a plurality of cable decoders, one for each of the subscribers, connected to the cable network, the method comprising:
storing at said head end transmitting system demographic/psychographic information about the subscribers,
transmitting from said head end transmitting system the demographic/psychographic information for each subscriber to the one of the plurality of cable decoders for that subscriber, free of input by the subscribers, the demographic/psychographic information being transmitted as a first program tag,
storing the demographic/psychographic information for each subscriber at the one of the plurality of cable decoders for that subscriber,
transmitting from said head end transmitting system a demographic/psychographic profile together with the message as a second program tag for desired recipients of the message subsequently to transmitting the demographic/psychographic information, comparing the demographic/psychographic profile with the demographic/psychographic information stored at that one of the plurality of cable decoders, and
enabling that one of the plurality of cable decoders to provide the message to that one of the subscribers corresponding to that one of the plurality of cable decoders when the transmitted demographic/psychographic profile matches the stored demographic/psychographic information.

25. A method for selective transmission of a message to subscribers of a cable television service, the service including a cable network, a head end transmitting system connected to the cable network, and a plurality of cable decoders, one for each of the subscribers, connected to the cable network, the method comprising:

storing from said head end transmitting system demographic/psychographic information about the subscribers, transmitting from said head end transmitting system the demographic/psychographic information for each subscriber to the one of the plurality of cable decoders for that subscriber, free of input by the subscribers, storing the demographic/psychographic information for each subscriber at the one of the plurality of cable decoders for that subscriber, transmitting from said head end transmitting system a demographic/psychographic profile for desired recipients of the message, transmitting the message, comparing the demographic/psychographic profile with the demographic/psychographic information stored at that one of the plurality of cable decoders, and enabling that one of the plurality of cable decoders to provide the message to that one of the subscribers corresponding to that one of the plurality of cable decoders when the transmitted demographic/psychographic profile matches the stored demographic/psychographic information, and providing alternative messages for selective transmission, where the alternative messages are provided on different channels through cascading barker channels.

26. A method for selective transmission of a message to subscribers of a cable television service, the service including a cable network, a head end transmitting system connected to the cable network, and a plurality of cable decoders, one for each of the subscribers, connected to the cable network, the method comprising:

storing at said head end transmitting system demographic/psychographic information about the subscribers, transmitting from said head end transmitting system the demographic/psychographic information for each subscriber to the one of the plurality of cable decoders for that subscriber, free of input by the subscribers, storing the demographic/psychographic information for each subscriber at the one of the plurality of cable decoders for that subscriber, transmitting from said head end transmitting system a demographic/psychographic profile for desired recipients of the message, transmitting the message, comparing the demographic/psychographic profile with the demographic/psychographic information stored at that one of the plurality of cable decoders, and enabling that one of the plurality of cable decoders to provide the message to that one of the subscribers corresponding to that one of the plurality of cable decoders when the transmitted demographic/psychographic profile matches the stored demographic/psychographic information, and providing alternative messages for the selective transmission, where the alternative messages are provided on different channels through overlapping pay-per-view events.

27. A system for selective transmission of a message to subscribers of a cable television service, comprising:

a cable network, a head end transmitting system connected to said cable network and operating under control of a system clock, a plurality of cable decoders, one for each of the subscribers, connected to said cable network, means at said head end transmitting system for storing demographic/psychographic information about the subscribers and transmitting the demographic/psychographic information for each subscriber to the one of said plurality of cable decoders for that subscriber, free of input by the subscribers, means at each one of said plurality of cable decoders for storing the demographic/psychographic information for each subscriber, means at said head end transmitting system for transmitting a demographic/psychographic profile for desired recipients of the message and for transmitting the message, said means for transmitting being responsive to said system clock to define duration of pay-per-view events and to define a shortened duration of the pay-per-view events by updating said system clock after initiation of a pay-per-view event, means at each one of said plurality of cable decoders for comparing the demographic/psychographic profile with the demographic/psychographic information stored at that one of said plurality of cable decoders and for enabling that one of said plurality of cable decoders to provide the message to that one of the subscribers corresponding to that one of said plurality of cable decoders when the transmitted demographic/psychographic profile matches the stored demographic/psychographic information, and means at said head end transmitting system for providing alternative messages for selective transmission and operated to provide the alternative messages on different channels, said means for comparing and enabling being operated to provide the alternative messages on different channels through overlapping pay-per-view events.

28. The method of claim 26 in which the head end transmitting means operates under control of a system clock, duration of the pay-per-view events is defined with the system clock and a shortened duration of the pay-per-view events is defined by updating the system clock after initiation of a pay-per-view event.

* * * * *